March 17, 1970  E. P. MORAN  3,501,711

ZERO-VOLTAGE DRIVEN-CABLE AMPLIFIER

Filed Nov. 12, 1968  2 Sheets-Sheet 1

INVENTOR
EDWARD P. MORAN
BY
Ward, Haselton, McElhannon, Brooks & Fitzpatrick
ATTORNEYS.

March 17, 1970 E. P. MORAN 3,501,711

ZERO-VOLTAGE DRIVEN-CABLE AMPLIFIER

Filed Nov. 12, 1968 2 Sheets-Sheet 2

INVENTOR.
EDWARD P. MORAN

BY

*Ward, McElhaney, Brooks & Fitzpatrick*
ATTORNEYS

United States Patent Office 3,501,711
Patented Mar. 17, 1970

---

3,501,711
ZERO-VOLTAGE DRIVEN-CABLE AMPLIFIER
Edward P. Moran, North Haven, Conn., assignor to Textron Inc., Providence, R.I., a corporation of Delaware
Continuation-in-part of application Ser. No. 631,383, Apr. 17, 1967. This application Nov. 12, 1968, Ser. No. 777,995
Int. Cl. H03f 3/04, 3/68
U.S. Cl. 330—22
17 Claims

ABSTRACT OF THE DISCLOSURE

Current from a substantially constant voltage D.C. source passes through a fixed impedance and the series regulator device of a series-shunt voltage regulator and is fed through a two-conductor cable to a voltage-to-current or charge-to-current converter. A signal is derived across the fixed impedance and amplified which is proportional to any signal voltage or charge applied to the converter. Additional series-shunt voltage regulators may be inserted at spaced points along the cable to extend the usable cable length.

---

This application is a continuation-in-part of my application Ser. No. 631,383, filed Apr. 17, 1967.

The present invention relates to a signal transmission system for coupling the output of a high internal impedance source over a cable to a remote point in a manner avoiding the usual adverse effects of cable capacitance and leakage resistance.

It is often necessary to couple the signal from a high impedance source, such as a piezoelectric transducer, over a long length of cable to a remote utilization point. It is well known that severe limitations are placed upon the distance that can be covered in view of the cable capacitance and its leakage resistance. Numerous attempts have been made in the past to overcome this difficulty, but all have one or more disadvantages or limitations.

The present invention provides a system which is less sensitive to cable capacitance and leakage, thereby enabling longer cable lengths to be employed. The system provides a low impedance termination at the utilization point minimizing sensitivity to electrical pick-up by the cable and to noise induced in the cable by flexing at low frequencies. The frequency response of the system is not adversely affected by the normal values of cable leakage resistance and cable capacitance.

Although the invention described herein may be employed in connection with the transmission of signals originating from a variety of high impedance electrical sources, its most important application now known is in connection with the utilization of signals generated by charge generating sources as, for example, a piezoelectric transducer. It will be apparent that the invention can be employed to advantage in transmitting the signals from condenser microphones, temperature transducers of the pyroelectric type, and the like.

According to the invention, there is provided a signal transmission system for coupling the output of a signal source over a two-conductor cable to a remote point comprising means for converting an input signal to an output current signal, the means having input terminals for connection to the source and having a two-terminal output for connection to one end of the cable; a source of voltage regulated D.C. energy; a fixed impedance; a variable impedance; means connecting in series the source of regulated energy, fixed impedance, and variable impedance for connection across the other end of the cable; means connected across the series arrangement of source and impedances responsive to the voltage thereacross for controlling the variable impedance in a direction tending to maintain constant the last mentioned voltage; and means coupled to the fixed impedance for providing an output voltage as a function of the current flowing through the fixed impedance.

It is believed that the invention will be better understood after reading the following detailed description thereof with reference to the appended drawings in which.

Figures 1, 2:
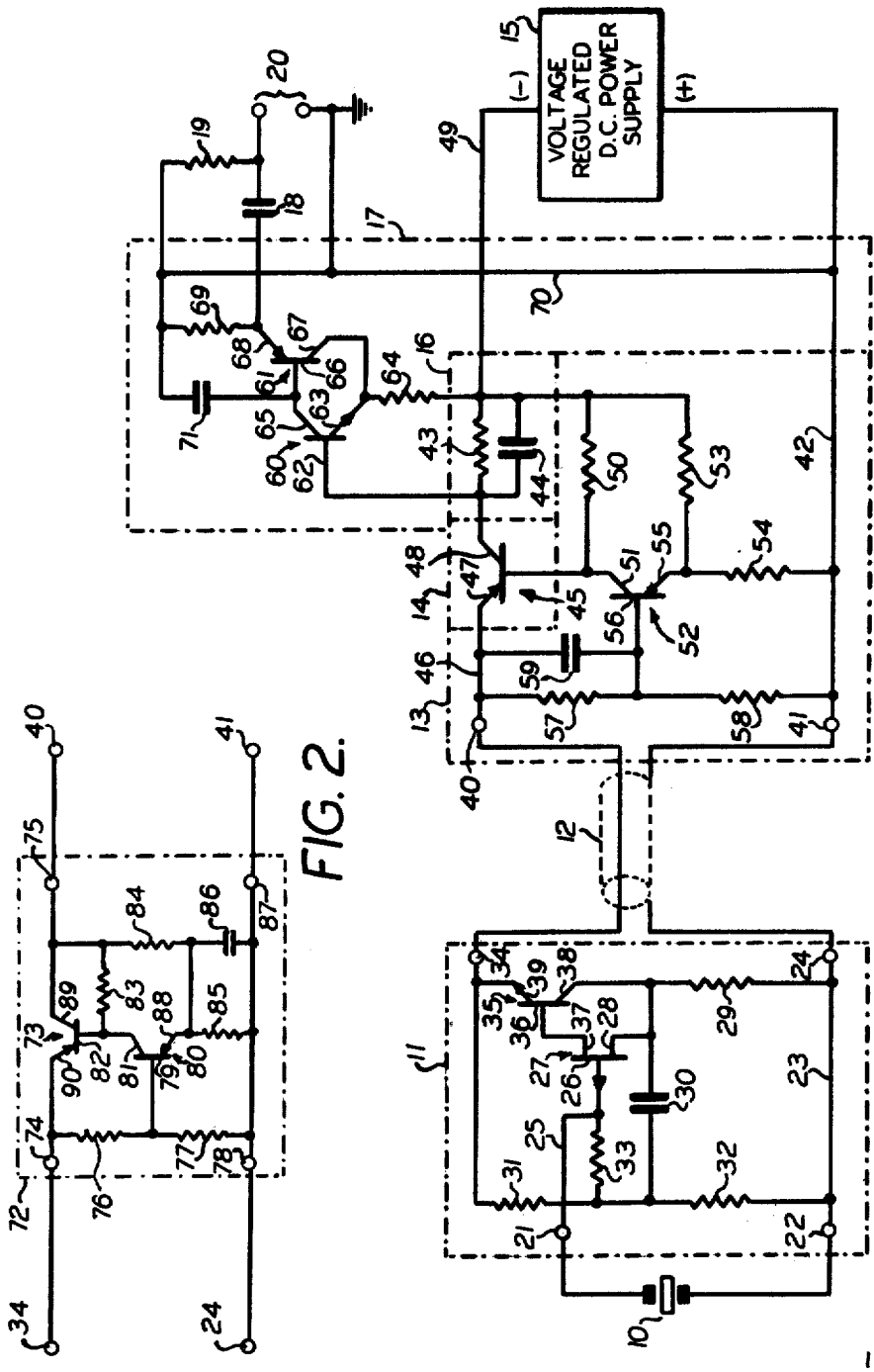
FIGURE 1 is a schematic diagram of an embodiment of the system employing a voltage-to-current stage.
FIGURE 2 is a fragmentary schematic diagram showing a modification of the system of FIGURE 1.

Referring now to FIGURE 1 of the drawing, a piezoelectric transducer 10 is shown connected to the input of a high input impedance amplifier encompassed within the outline box 11. The amplifier 11 may also be considered a voltage-to-current converter. A two conductor transmission cable 12 having distributed capacitance and leakage resistance connects the amplifier 11 to the distant point and across a voltage sensing and regulator control element within the outline box 13. In series with one conductor of the cable 12 is a series regulator element, shown within box 14, controlled by the voltage sensing element 13. A voltage regulated D.C. power supply 15 is connected in series with an impedance 16 to the series regulator element 14, as shown. An amplifier within box 17 has its input connected across the impedance 16 while obtaining energizing power from the power supply 15. A network of capacitor 18 and resistor 19 connects the output of amplifier 17 to a pair of output terminals 20.

Considering the amplifier 11 in greater detail, it has input terminals 21 and 22 for connection to the piezoelectric transducer 10 or other source. Terminal 22 is joined by a conductive connection 23 to an output terminal 24 for the amplifier, it being assumed that amplifier 11 is to be located closely adjacent the transducer 10. The input terminal 21 is connected by lead 25 to the gate electrode 26 of a field effect transistor 27. The source electrode 28 of transistor 27 is connected through a resistor 29 to the conductive connection 23, as shown. The electrode 28 is also connected through a capacitor 30 to the junction between resistors 31, 32, and 33. Resistor 33 connects gate 26 to said junction while the resistors 31 and 32 constitute a voltage divider connected between the conductive connection 23 and the output terminal 34. The output stage of amplifier 11 includes a current control device in the form of an N-P-N transistor 35. As shown, the base electrode 36 of transistor 35 is connected to the drain electrode 37 of the field effect transistor 27. The collector electrode 38 of transistor 35 is connected to the junction between resistor 29 and source electrode 28. The emitter electrode 39 is connected to terminal 34.

As shown, the cable 12, having two conductors, connects the output terminals 24 and 34 of amplifier 11 to the input terminals 40 and 41 of the utilization circuit which may be several hundred feet away. Terminal 41 is connected to the ground or reference line 42. The impedance 16, it should be observed, includes a resistor 43 connected in parallel with a capacitor 44. The series regulator element 14 is shown as consisting of a P-N-P transistor 45.

A series circuit can now be traced from terminal 40 over a conductor 46 to the emitter electrode 47 of transistor 45, and then from collector electrode 48 through the parallel arrangement of resistor 43 and condenser 44 over connection 49 to the negative terminal of the voltage regulated D.C. power supply 15. The positive terminal of the supply 15 is connected to the ground line 42.

Current is supplied from the negative terminal of supply 15 over connection 49 through a load resistor 50 to the collector electrode 51 of a further P-N-P transistor 52. Electrode 51 is also conductively connected to the base electrode of transistor 45. Resistors 53 and 54 are connected in series across the supply 15 with their junction connected to the emitter electrode 55 of transistor 52. The base electrode 56 of transistor 52 is connected to the junction between resistors 57 and 58 which are connected between terminals 40 and 41. The resistor 57 is shunted by a bypass capacitor 59.

The output amplifier 17 includes an N-P-N transistor 60 and a P-N-P transistor 61 connected in cascade. As shown, the base electrode 62 of transistor 60 is connected by a conductive connection directly to the junction between resistor 43 and the collector electrode 48 of transistor 45. The emitter electrode 63 of transistor 60 is connected through a resistor 64 to the opposite end of resistor 43. Collector electrode 65 of transistor 60 is directly connected to the base electrode 66 of transistor 61. The collector electrode 67 of transistor 61 is connected to the junction between resistor 64 and emitter electrode 63. The emitter electrode 68 of transistor 61 is connected through resistor 69 and conductive connection 70 to the ground lead 42. The connection 70 is also connected to one of the output terminals 20. The other terminal of the pair 20 is connected, as shown, both through resistor 19 to the conductive connection 70 and through capacitor 18 to the emitter 68. Finally, the capacitor 71 is connected between the base electrode 66 and the conductive connection 70.

It should now be apparent that the transistors in the amplifier circuit 11 receive their energizing power over a circuit that can be traced from the negative terminal of power supply 15 through conductor 49, resistor 43, transistor 45, connection 46, terminal 40, a conductor of cable 12 (preferably the inner conductor where cable 12 is of the co-axial type), terminal 34, through the transistors 35 and 27 to the load resistor 29, then from terminal 24 through the outer conductor of cable 12 to terminal 41 and over the ground connection 42 to the positive terminal of the supply 15. Fluctuation in voltage appearing at terminals 40 and 41 due to change in the conductivity of transistor 35 as a result of a signal obtained from transducer 10 is applied through the network consisting of resistors 57 and 58 and capacitor 59 to the base electrode 56 of transistor 52. This fluctuation in voltage is compared with a reference voltage applied to the emitter electrode 55 from the voltage divider consisting of resistors 53 and 54. It will be noted that the resistors 53 and 54 are connected across the regulated power supply 15. Thus, in well known manner, the conductivity of transistor 52 will be varied as a function of the voltage appearing between terminals 40 and 41.

Variation in the conductivity of transistor 52 will cause a controlling voltage to appear across resistor 50. This, in turn, determines the conductivity and, therefore, the impedance of transistor 45 to current flowing therethrough to terminal 40. It should now be apparent that the circuit consisting of the elements in outline boxes 13 and 14 constitutes a voltage regulator which will tend to maintain substantially constant the voltage applied to terminals 40 and 41. However, the current supplied through cable 12 to amplifier 11 will vary. This variation in current will cause a signal voltage to appear across resistor 43 which, in turn, is amplified by the two stages of amplification in amplifier 17.

It will be understood that the transistors 27 and 35 consistute a unipolar-bipolar cascade amplifier which, by reason of the field effect transistor, has a very high input impedance. The transfer characteristic of this amplifier or electron device 11 is controlled by the signal obtained from the piezoelectric source 10.

A satisfactory embodiment of the circuit of FIGURE 1 was constructed with the circuit constants set forth in the following tabulation. It will be understood that these values are only exemplary.

Resistors

| Ref. No.: | Ohms |
|---|---|
| 19 | 100K |
| 29 | 1,000 |
| 31 | 3.3M |
| 32 | 2.2M |
| 33 | 22.0M |
| 43 | 1,000 |
| 50 | 20.0K |
| 53 | 5,620 |
| 54 | 1,580 |
| 57 | 5,620 |
| 58 | 5,620 |
| 64 | 1,000 |
| 69 | 1,000 |

Capacitors

| Ref. No.: | Mfd. |
|---|---|
| 18 | 50 |
| 30 | 3.3 |
| 44 | $2200 \times 10^{-6}$ |
| 59 | 1 |
| 71 | $100 \times 10^{-6}$ |

Transistors

| Ref. No.: | Type |
|---|---|
| 27 | 2N2606 |
| 35 | 2N3904 |
| 45 | 2N3906 |
| 52 | 2N3906 |
| 60 | 2N3904 |
| 61 | 2N3906 |

Power supply 15—42 volts.

In the above tabulation $K = \times 10^3$ and $M = \times 10^6$.

The length of cable that can be used with the system described in conjunction with FIGURE 1 can be increased considerably by inserting additional voltage regulator circuits at intermediate points along the cable as shown in FIGURE 2.

As seen in FIGURE 2, a four-terminal voltage regulator circuit within the outline box 72 is inserted in the cable between the terminals 24, 34 on the one hand and the terminals 40, 41 on the other hand. The regulator circuit includes a series regulator element or variable impedance in the form of a P-N-P transistor 73 connected between terminals 74 and 75. The voltage divider consisting of resistors 76 and 77 is connected between terminal 74 and a terminal 78, as shown. The junction of resistors 76 and 77 is connected to the base electrode 79 of another P-N-P transistor 80. The collector electrode 81 of transistor 80 is connected to the base electrode 82 of transistor 73 and through a load resistor 83 to the terminal 75. A biasing network consisting of resistors 84 and 85 and capacitor 86 is connected, as shown, between terminals 75 and another terminal 87. The emitter electrode 88 of transistor 80 is connected to the common junction of the three elements of the biasing network. Transistor 73 has its collector electrode 89 connected to terminal 75 and its emitter electrode 90 connected to terminal 74.

In operation, the transistors 73 and 80 of FIGURE 2 function in very much the same manner as the respective transistors 45 and 52 in FIGURE 1.

Although only one in-line regulator is shown in FIGURE 2, several may be used at spaced locations.

Typical circuit constants for the circuit of FIGURE 2, are: resistors 76, 77 and 85—5,620 ohms each; resistors 83 and 84—10.0K ohms each; capacitor 86—10 microfarad; transistors 73 and 80—type 2N3906.

While the voltage-to-current amplifier stage 11 is quite satisfactory in the system of FIGURE 1 when it can be located closely adjacent to the source 10, it has certain limitations when location proximate to the source 10 is not possible. In the latter situation, as a result of its high impedance input, it is susceptible to noise pick-up and calibration is a problem, particularly when it is used in conjunction with charge generating devices such as piezoelectric transducers. Therefore, when it is required to locate the initial stage of the signal transmission system at some distance from the signal source with a cable therebetween, it will be found advantageous to use the charge-to-current converter stage shown in FIGURE 3, to which attention is now directed.

Figure 3:
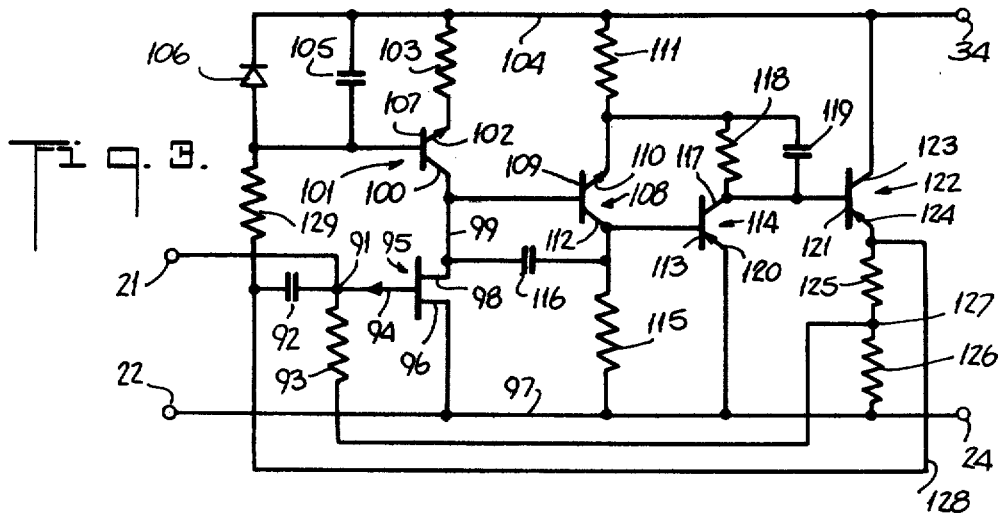
FIGURE 3 is a fragmentary schematic diagram showing a charge-to-current stage for replacing the voltage-to-current stage in FIGURE 1.

The circuit shown in FIGURE 3 may be substituted directly for the voltage-to-current converter 11 of FIGURE 1, between the terminals 21 and 22 on the input side and the terminals 24 and 34 on the output side. As shown in FIGURE 3, the input terminal 21 is connected to a junction point 91 between a capacitor 92, a resistor 93, and the gate electrode 94 of a field effect transistor 95. The source electrode 96 of field effect transistor 95 is connected directly to the positive bus 97 extending between the terminals 22 and 24. The drain electrode 98 of transistor 95 is connected by a lead 99 to the collector electrode 100 of an N–P–N transistor 101. Transistor 101 has its emitter electrode 102 connected through a resistor 103 to a negative bus 104 leading to terminal 34. A parallel arrangement of a condenser 105 and a current regulating diode 106 joins the base electrode 107 of transistor 101 to the bus 104.

Another N–P–N transistor 108 has its base electrode 109 connected to the lead 99, its emitter electrode 110 connected through a resistor 111 to the bus 104, and its collector electrode 112 connected to the base electrode 113 of a further transistor 114. The junction between collector 112 and base electrode 113 is connected through a resistor 115 to the positive bus 97 and through a capacitor 116 to the lead 99. The emitter electrode 110 of transistor 108 is connected to the collector electrode 117 of a P–N–P transistor 114 by a parallel combination of resistor 118 and capacitor 119. The emitter electrode 120 of transistor 114 is connected directly to the bus 97.

The collector electrode 117 of transistor 114 is also connected to the base electrode 121 of another P-N-P transistor 122. The collector electrode 123 of transistor 122 is connected directly to the bus 104. The emitter electrode 124 of transistor 122 is connected through two resistors 125 and 126 in series to the bus 97. The junction 127 between the resistors 125 and 126 is connected to the free end of resistor 93, as shown. A lead 128 connects the feedback point at the emitter electrode 124 of transistor 122 to the free end of capacitor 92 and also through a resistor 129 to the base electrode of transistor 101.

The transistors 95, 101, 108, 114 and 122, as interconnected in FIGURE 3, constitute an amplifier with a high open loop voltage gain. The field effect transistor 95 is employed for its high input impedance and high voltage gain. Transistors 108 and 114 along with their associated components, resistors 111, 115 and 118 and capacitors 116 and 119, provide impedance matching and low voltage gain between the output of the field effect transistor 95 and the input of the output transistor 122. Whereas the field effect transistor 95 may have a voltage gain of the order of 500 the impedance matching stages involving transistors 108 and 114 may have a gain of about 2½.

Transistor 122 with its output load resistances 125 and 126 provides further impedance matching. The network including the lead 128, resistor 129, diode 106 and capacitor 105 provides low frequency feedback which is used to control the operating point of transistor 101 which acts as a current source providing negative D.C. feedback for stabilizing the quiescent operating point of the circuit. Resistor 93 which interconnects the junction 127 with the gate electrode 94 of the field effect transistor 95 provides additional low frequency feedback. The connection of capacitor 92 between emitter 124 and gate electrode 94 provides negative capacitive feedback which, with the high open loop gain, causes the entire stage to have a large effective input capacitance.

In operation, the voltage at the gate electrode of transistor 95, resulting from a charge input signal applied to terminal 21, is amplified and returned to the input by means of the feedback capacitor 92 with a negative orientation so as to maintain the input voltage at junction 91 very close to zero. It can be shown that practically all the input charge is stored in the feedback capacitor 92 producing a voltage across its terminals equal to the value of the input charge divided by its capacitance. The voltage at the emitter 124 of transistor 122 will, for all practical purposes, be equal to the voltage across the feedback capacitor 92. It can be shown that the current flowing through the transistor 122 between terminals 34 and 24 is substantially proportional to the charge applied to the input terminals 21 and 22.

When the circuit of FIGURE 3 is substituted for the amplifier 11 in the system of FIGURE 1, the utilization circuit and cable 12 function in precisely the same manner previously described in connection with the description of FIGURE 1. Thus, the voltage signal appearing at output terminals 20 in FIGURE 1 will be proportional to the charge signal applied to terminals 21 and 22 when the charge-to-current converter of FIGURE 3 is utilized.

Figure 4:
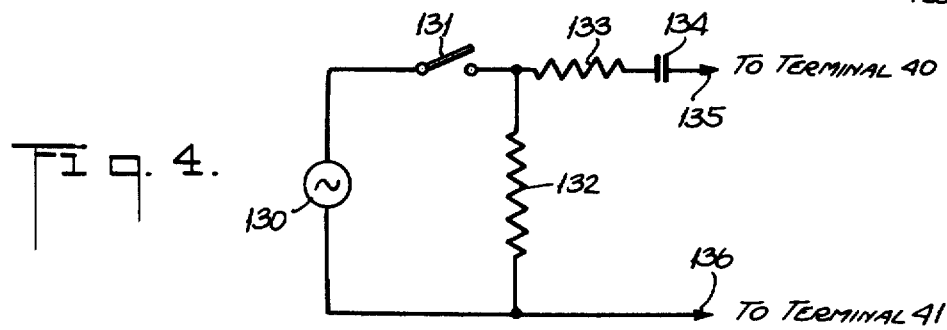
FIGURE 4 is a schematic diagram of a calibration circuit for calibrating the circuit shown in FIGURE 1.

It is often desirable to check the calibration of a measuring instrument such as the one described herein. For this purpose use may be made of the circuit shown in FIGURE 4 consisting of a source of A.C. voltage 130 of predetermined magnitude, a normally open test switch 131, a shunt resistor 132, a current determing series resistor 133, and a series capacitor 134. These components are connected as shown in FIGURE 4 to output terminals 135 and 136 which are connected, respectively, to terminals 40 and 41 of the utilization device shown in FIGURE 1. When the switch 131 is closed a current of known magnitude is injected as a calibration signal at terminals 40 and 41. If the system is functioning properly a predetermined voltage should be obtained at terminals 20. The capacitor 134 provides decoupling to prevent D.C. voltage from power supply 15 reaching the test source 130. Resistor 133 is chosen in relation to source 130 to provide a known current for calibration purposes. The resistor 132 shunting the source 130 and switch 131 causes capacitor 134 to remain charged in order to avoid transient effects when switch 131 is closed.

Since the source 10, its associated input cable, the converter 11, or the converter of FIGURE 3, and most of the main transmission cable 12, may be located several hundred feet from the utilization circuit, it is desirable to have a circuit or means located at the utilization point capable of detecting trouble in the remote parts of the system. An arrangement for detecting abnormal operating conditions is shown in FIGURE 5.

Figure 5:
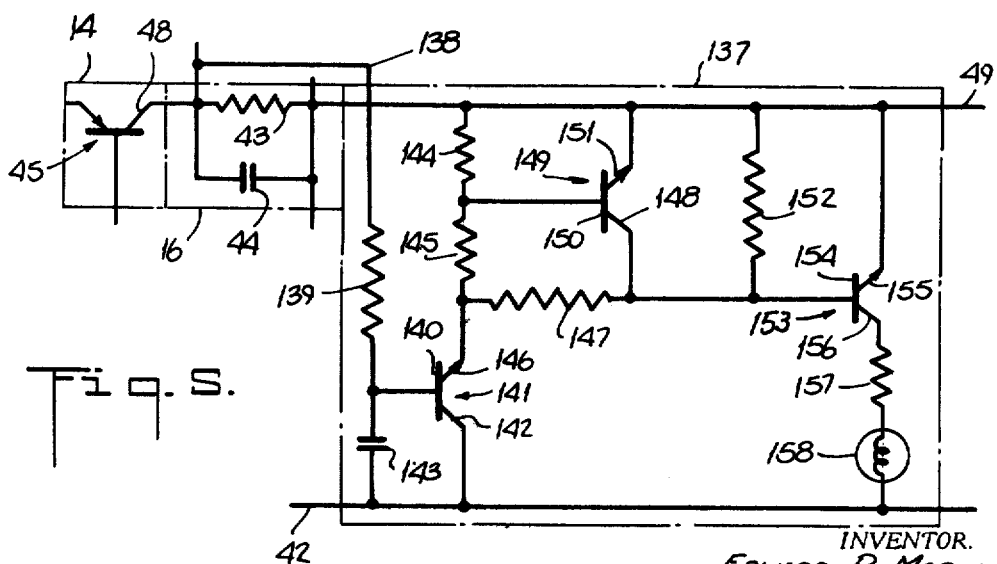
FIGURE 5 is a fragmentary schematic diagram showing a supervisory circuit for use with the circuit of FIGURE 1 to provide an indication of proper operation thereof.

As seen in FIGURE 5, the supervisory circuit components are contained within the box 137. Only so much of the circuit of FIGURE 1 is shown as is necessary to illustrate the manner in which the circuit 137 is connected thereto. The components in box 137 are connected between the positive and negative leads 42 and 49 with an input derived from the junction between the collector electrode 48 and the fixed impedance 16. Thus, the aforesaid junction is connected by a lead 138 through a resistor 139 to the base electrode 140 of an N-P-N transistor 141. The collector electrode 142 of the transistor 141 is connected directly to the lead 42. A capacitor 143 is also connected between the lead 42 and the base electrode 140. A pair of resistors 144 and 145 are connected in series between the lead 49 and the emitter electrode 146 of transistor 141. A further resistor 147 is connected from the emitter electrode 146 to the collector electrode 148 of an N-P-N transistor 149 whose base electrode 150 is connected to the junction between resistors 144 and 145. The emitter electrode 151 of transistor 149 is connected directly to the lead 49. Shunting the emitter-collector circuit of transistor 149 is a resistor 152. A further N-P-N transistor 153 has its base electrode 154 connected to the collector electrode 148 of transistor 149. The emitter electrode 155 of transistor 153 is connected directly to the lead 49. The collector electrode 156 of transistor 153 is connected through a resistor 157 and a signal lamp 158 in series to the lead 42.

The resistor 139 and capacitor 143 provide a low pass filter through which the signal appearing at the collector electrode of transistor 45 (i.e., the voltage drop across the fixed impedance 16) is applied to the base electrode 140 of transistor 141. Due to the filtering action this signal provides or causes a current to flow through the emitter circuit of transistor 141 which is proportional to the quiescent current flowing through the impedance 16 to the remote part of the system.

Resistors 144, 145, 147 and 152 are chosen so that the emitter current of transistor 141 is distributed in a manner resulting in the following operating conditions: (a) when the system quiescent or steady state current is abnormally low, below a given lower limit, the voltage at the emitter 146 will be insufficient to render either transistor 149 or transistor 153 conductive and the lamp 158 will be extinguished; (b) when the steady state current is normal, the voltage at emitter 146 is insufficient to render transistor 149 conductive, although it is sufficient to cause transistor 153 to conduct and energize lamp 158; and (c) when an abnormally high steady state current traverses impedance 16 the voltage at emitter 146 will be sufficient to cause transistor 149 to conduct thereby rendering transistor 153 non-conductive and extinguishing the lamp 158. It should now be apparent that transistors 141, 149 and 153 are connected to form a switching network for the control of the signaling device or lamp 158. Thus, it will be seen that the circuit of FIGURE 5 provides a high and low level signaling arrangement for providing a signal manifestation when the overall system is operating properly and when it is not.

It is to be understood that the calibration circuit of FIGURE 4 and the supervisory circuit of FIGURE 5 may be used individually or collectively with the utilization circuit of FIGURE 1 in conjunction with either the voltage-to-current converter 11 or the charge-to-current converter of FIGURE 3. Furthermore, with each of these combinations it is also possible to employ the in-line regulator of FIGURE 2.

Considering the transistor 35 and resistor 29 in FIGURE 1 and the transistor 122 and resistors 125 and 126 in FIGURE 3, it should now be apparent that the transistors may each be considered as constituting a current control device which is connected in series with a fixed load impedance, i.e., the associated resistors, across the two-terminal output which serves to connect it to the main transmission cable.

Typical circuit constants for the components used in the circuits of FIGURES 3, 4 and 5 are tabulated below:

Resistors

| Ref. No.: | Ohms |
|---|---|
| 93 | 22M |
| 103 | 10K |
| 111 | 18K |
| 115 | 18K |
| 118 | 27K |
| 125 | 923 |
| 126 | 47 |
| 129 | 39K |
| 132 | 22K |
| 133 | 1K |
| 139 | 150K |
| 144 | 470 |
| 145 | 10K |
| 147 | 10K |
| 152 | 2.7K |
| 157 | 1.2K |

Capacitors

| Ref. No.: | Mfd. |
|---|---|
| 92 | 0.001 |
| 105 | 180 |
| 116 | $22 \times 10^{-6}$ |
| 119 | $100 \times 10^{-6}$ |
| 134 | 100 |
| 143 | 2 |

Semiconductors

| Ref. No.: | Type |
|---|---|
| 95 | 2N3698 |
| 101 | D26E-1 |
| 106 | 1N5283 |
| 108 | D26E-1 |
| 114 | 2N3906 |
| 122 | 2N3906 |
| 141 | 2N3904 |
| 149 | 2N3904 |
| 153 | 2N3904 |

Lamp=14 v. 27 ma.

In the above table $K = \times 10^3$ and $M = \times 10^6$.

Having described the invention in terms of the presently preferred embodiments thereof, it will be understood that numerous changes may be made therein without departing from the true spirit of the invention.

What is claimed is:

1. A signal transmission system for coupling the output of a high internal impedance source over a two-conductor cable to a remote point comprising: means for converting an input voltage signal to an output current signal, said means having a high input impedance and input terminals for connection to said source and having a two-terminal output for connection to one end of said cable; a source of voltage regulated D.C. energy; a fixed impedance; a variable impedance; means connecting in series said source of regulated energy, fixed impedance, and variable impedance for connection across the other end of said cable; means connected across said series arrangement of source and impedances responsive to the voltage thereacross for controlling said variable impedance in a direction tending to maintain constant said last mentioned voltage; and means coupled to said fixed impedance for providing an output voltage as a function of the current flowing through said fixed impedance.

2. A signal transmission system according to claim 1, wherein the means for converting an input voltage signal to an output current signal comprises an amplifier circuit including a current control device having at least three electrodes, a first and second one of said electrodes being coupled to said two terminal output for receiving energizing current therethrough from said cable, and means for coupling said input terminals between at least the third one of said electrodes and one of said other electrodes for varying the current flowing between said first and second electrodes as a function of the voltage applied to said input terminals.

3. A signal transmission system according to claim 1, wherein the means for converting an input voltage signal to an output current signal comprises a unipolar-bipolar cascade transistor amplifier, the energizing terminals of said amplifier being connected to said two-terminal output for receiving energizing current therethrough from said cable, said unipolar transistor being of the field effect type and having its gate and source electrodes coupled, respectively, each to a different one of said input terminals.

4. A signal transmission system according to claim 1 further comprising at least one four-terminal voltage regulator circuit for insertion in line with the cable at an intermediate point thereof.

5. A signal transmission system for coupling the output of a high internal impedance source over a two-conductor cable to a distant point comprising: a source of regulated D.C. voltage, a normally fixed impedance, a cable having at least two conductors, said source of voltage being coupled in series through said impedance to one end of said two conductors for supplying electric energy thereto, an electron device coupled to the other end of said conductors for receiving its energization and controlling the current flowing therethrough, means for connecting said high internal impedance source to said electron device for controlling the transfer characteristic of the latter, means coupled to said one end of said two conductors for maintaining the voltage applied thereto substantially constant independent of variation in current flow, and means coupled across said normally fixed impedance for deriving an output as a function of the current passing therethrough.

6. A signal transmission system according to claim 5, wherein said electron device constitutes the output stage of a high input impedance amplifier.

7. A signal transmission system according to claim 5, further comprising at least one four-terminal voltage regulator circuit connected in line with said two conductors at an intermediate point thereof.

8. A signal transmission system according to claim 7, wherein said four-terminal regulator circuit comprises a variable impedance device connected in series with one of said conductors, and means connected between said two conductors and coupled to said variable impedance device for controlling the impedance of the latter in response to fluctuation of the voltage between said conductors to tend to maintain said voltage constant.

9. A signal transmission system according to claim 5, wherein said electron device comprises a charge amplifier circuit coupled to provide charge-to-current conversion.

10. A signal transmission system for coupling the output of a signal source over a two-conductor cable to a remote point comprising: means for converting an input signal to an output current signal, said means having input terminals for connection to said source and having a two-terminal output for connection to one end of said cable; a source of voltage regulated D.C. energy; a fixed impedance; a variable impedance; means connecting in series said source of regulated energy; fixed impedance, and variable impedance for connection across the other end of said cable; means connected across said series arrangement of source and impedances responsive to the voltage thereacross for controlling said variable impedance in a direction tending to maintain constant said last mentioned voltage; and means coupled to said fixed impedance for providing an output voltage as a function of the current flowing through said fixed impedance.

11. A signal transmission system according to claim 10, wherein the means for converting an input signal to an output current signal comprises an amplifier circuit with high open loop gain coupled to said two terminal output for receiving energizing current therethrough from said cable, said amplifier circuit having a voltage feedback point and a signal input point, means for coupling said input terminals to said signal input point, and capacitive means coupled in a negative feedback circuit between said feedback and input points for varying the current flowing through said amplifier circuit as a function of the charge applied to said input terminals.

12. A signal transmission system according to claim 10, wherein the means for converting an input signal to an output current signal comprises: a current control device, a fixed load impedance, means connecting said current control device in series with said load impedance across said two-terminal output, and means interconnecting said input terminals with said current control device for varying the current flowing through said device as a function of the signal applied to said input terminals.

13. A signal transmission system according to claim 10, wherein means are connected across said series arrangement of source and impedances for selectively supplying as a calibration signal an alternating current of known magnitude thereto.

14. A signal transmission system according to claim 13, wherein said means for supplying a calibration signal comprises a source of A.C. voltage of predetermined magnitude connected in series with a normally open test switch, a current determining resistor and a capacitor across said series arrangement of source and impedances, said test switch being connected nearest to said A.C. source, and a further resistor connected in parallel with the series arrangement of test switch and A.C. source.

15. A signal transmission system according to claim 10, wherein further means are coupled to said fixed impedance for providing a first signal manifestation when the steady state current flowing through said fixed impedance is between given upper and lower limits and a second signal manifestation when said steady state current falls outside of said given limits.

16. A signal transmission system according to claim 15, wherein said further means comprises a low pass filter coupled to said fixed impedance responsive to the voltage drop thereacross, a switching network having an input coupled to an output of said low pass filter and having an output, and a signaling device coupled to said output of the switching network, said switching network being arranged to energize said signaling device when the steady state current through said fixed impedance is between said given upper and lower limits.

17. A signal transmission system for coupling the output of a signal source over a two-conductor cable to a remote point comprising: a source of voltage regulated D.C. energy; a fixed impedance; a variable impedance; means connecting in series said source of regulated energy, fixed impedance, and variable impedance for connection across the end of said cable which is remote from said signal source; means connected across said series arrangement of source and impedances responsive to the voltage thereacross for controlling said variable impedance in a direction tending to maintain constant said last mentioned voltage; and means coupled to said fixed impedance for providing an output voltage as a function of the current flowing through said fixed impedance.

References Cited

UNITED STATES PATENTS

| | | | |
|---|---|---|---|
| 2,474,769 | 6/1949 | Young | 330—53 X |
| 3,048,659 | 8/1962 | Crow et al. | 330—40 X |
| 3,315,172 | 4/1967 | Durgin | 330—3 |
| 3,381,236 | 4/1967 | Davis | 330—53 |

ROY LAKE, Primary Examiner

JAMES B. MULLINS, Assistant Examiner

U.S. Cl. X.R.

330—38, 40, 53